United States Patent
Bangolae et al.

(10) Patent No.: US 9,877,236 B2
(45) Date of Patent: Jan. 23, 2018

(54) USER EQUIPMENT AND METHODS TO INDICATE POWER SAVING MODE CONFIGURATION TO RAN NODES

(71) Applicant: Intel IP Corporation, Santa Clara, CA (US)

(72) Inventors: Sangeetha L. Bangolae, Beaverton, OR (US); Marta Martinez Tarradell, Hillsboro, OR (US); Puneet Jain, Hillsboro, OR (US); Hyung-Nam Choi, Hamburg (DE); Ana Lucia Pinheiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/115,770

(22) PCT Filed: May 8, 2015

(86) PCT No.: PCT/US2015/029830
§ 371 (c)(1),
(2) Date: Aug. 1, 2016

(87) PCT Pub. No.: WO2015/171984
PCT Pub. Date: Nov. 12, 2015

(65) Prior Publication Data
US 2017/0013515 A1    Jan. 12, 2017

Related U.S. Application Data

(60) Provisional application No. 61/990,684, filed on May 8, 2014.

(51) Int. Cl.
*H04W 36/00*    (2009.01)
*H04W 76/06*    (2009.01)
(Continued)

(52) U.S. Cl.
CPC ....... *H04W 36/0055* (2013.01); *H04W 36/08* (2013.01); *H04W 52/0209* (2013.01);
(Continued)

(58) Field of Classification Search
CPC ............. H04W 36/0055; H04W 36/08; H04W 76/068; H04W 88/02; H04W 88/08;
(Continued)

(56) References Cited

U.S. PATENT DOCUMENTS 9,226,256 B2 *  12/2015  Velev ................... H04W 60/06
2015/0282082 A1 * 10/2015  Landais ............ H04W 52/0222
                                                     370/311
(Continued)

FOREIGN PATENT DOCUMENTS

EP              2725852 A1     4/2014
KR     1020130009845 A         1/2013
(Continued)

OTHER PUBLICATIONS

"International Application Serial No. PCT/US2015/029830, International Search Report dated Jul. 31, 2015", 3 pgs.
(Continued)

*Primary Examiner* — Wayne Cai
(74) *Attorney, Agent, or Firm* — Schwegman Lundberg & Woessner, P.A.

(57) ABSTRACT

An evolved NodeB (eNB), user equipment (UE) and mobility management entity (MME), as well as method of communicating using a power saving mode (PSM) are generally described. A PSM configuration indication of the UE may be received at the eNB from the UE or MME in an Initial UE Context Setup Request, a UE Context Modify Request, core network assistance information, or a dedicated message to the eNB. The eNB may adjust the time for transmitting to the UE an RRC connection release message based on the PSM
(Continued)

configuration indication. The eNB may determine whether the UE is in a connection mode and the inactivity timer of the eNB having reached the activation timer of the PSM configuration indication, transmit the RRC connection release message to the MME. The PSM configuration may be provided between eNBs during handover.

20 Claims, 4 Drawing Sheets

(51) Int. Cl.
*H04W 52/02* (2009.01)
*H04W 36/08* (2009.01)
*H04W 88/02* (2009.01)
*H04W 88/08* (2009.01)
*H04W 4/00* (2009.01)
*H04W 84/04* (2009.01)

(52) U.S. Cl.
CPC ..... *H04W 52/0235* (2013.01); *H04W 76/068* (2013.01); *H04W 4/005* (2013.01); *H04W 84/042* (2013.01); *H04W 88/02* (2013.01); *H04W 88/08* (2013.01); *Y02B 60/50* (2013.01)

(58) Field of Classification Search
CPC .......... H04W 84/042; H04W 52/0235; H04W 52/0209; H04W 4/005; Y02B 60/50
USPC ............ 455/13.4, 522, 571, 572, 574, 127.5
See application file for complete search history.

(56) References Cited

U.S. PATENT DOCUMENTS

2015/0282083 A1* 10/2015 Jeong ............... H04W 52/0216
370/311
2016/0381639 A1* 12/2016 Kim .................. H04W 52/0235
370/311

FOREIGN PATENT DOCUMENTS

| KR | 1020130069778 A | 6/2013 |
| KR | 1020130073835 A | 7/2013 |
| KR | 1020140026298 A | 3/2014 |
| WO | WO-2009121023 A1 | 10/2009 |
| WO | WO-2014051387 A1 | 4/2014 |

OTHER PUBLICATIONS

"International Application Serial No. PCT/US2015/029830, Written Opinion dated Jul. 31, 2015", 4 pgs.
"Korean Application Serial No. 10-2016-7028032, Office Action dated Jul. 11, 2017", w/English Translation, 9 pgs.
"Korean Application Serial No. 10-2016-7028032, Response Filed Sep. 11, 2017 to Office Action dated Jul. 11, 2017", (W/ English Claims), 18 pgs.
"Discussion on the introduction of Power Saving Mode in RAN specifications and related open aspects", Intel Corporation: 3GPP Draft; R2-141210, 3rd Generation Partnership Project (3GPP), Mobile Competence Centre; 650, Route Deslucioles; F-06921 Sophia-Antipolis Cedex; France vol. RAN WG2, No. Valencia, Spain, (Mar. 22, 2014).
"European Application Serial No. 15788846.2, Extended European Search Report dated Nov. 23, 2017", 9 pgs.

* cited by examiner

USER EQUIPMENT AND METHODS TO INDICATE POWER SAVING MODE CONFIGURATION TO RAN NODES

PRIORITY CLAIM

This application is a U.S. National Stage Filing under 35 U.S.C. 371 from International Application No. PCT/US2015/029830, filed May 8, 2015 and published in English as WO 2015/171984 on Nov. 12, 2015, which claims the benefit of priority to U.S. Provisional Patent Application Ser. No. 61/990,684, filed May 8, 2014, and entitled "PROCEDURES TO INDICATE: UE PSM (POWER SAVING MODE) CONFIGURATION TO RAN NODES," each of which is incorporated herein by reference in its entirety.

TECHNICAL FIELD

Embodiments pertain to radio access networks. Some embodiments relate to power saving in radio access networks, such as Long Term Evolution (LTE) networks and LTE advanced (LTE-A) networks.

BACKGROUND

Mobile networks may support various devices that may operate according to vastly different characteristics or requirements. Smartphones or similar devices may receive high data rates and download large amounts of data while Machine Type Communication (MTC) devices may transmit or receive far less data. The number of MTC devices is expected to explode to tens of billions of devices over the next decade. MTC devices may have different requirements than other $3^{rd}$ Generation Partnership Project (3GPP) user equipment (UE) in terms of optional feature support, traffic characteristic support, access priority, congestion management, ratio of signaling to user plane traffic, etc. Many MTC devices generate very low user plane traffic on the network and many such MTC devices can be considered as low access priority as defined in 3GPP Rel-10 specifications.

Even if the MTC devices use low priority access and send only small amount of data, the sheer increase in the number of MTC devices transmitting the data through Long Term Evolution (LTE) networks has the potential to overload the radio access network and/or core network of the LTE networks. Moreover, certain MTC devices may not be able to charge their batteries, making it desirable for these MTC devices to save battery power.

It would thus be desirable to improve power consumption of UEs, especially MTC devices.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
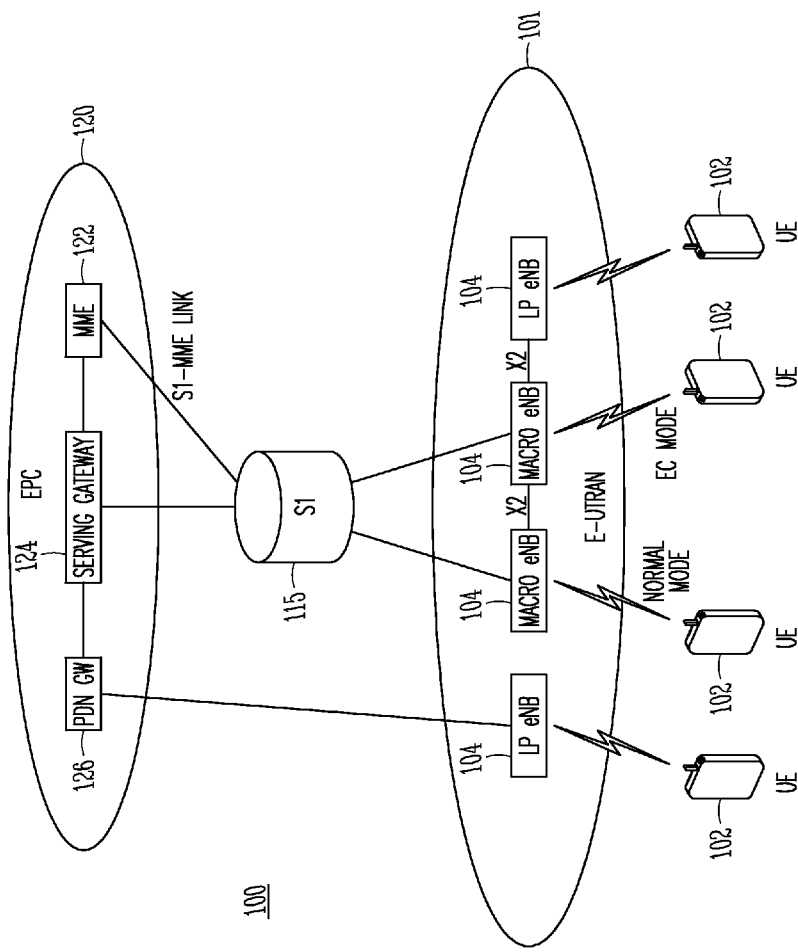
FIG. 1 shows an example of a portion of an end-to-end network architecture of an LTE network with various components of the network in accordance with some embodiments.

FIG. 1 shows an example of a portion of an end-to-end network architecture of a long term evolution (LTE) network with various components of the network in accordance with some embodiments. The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 may include mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The UE may be normal UE, such as a cell phone, or a low power (LP)/low complexity (LC) UE per 3GPP Rel-12 category 0 or Rel-13. The eNBs 104 may include macro eNBs and low power (LP) eNBs.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN may be any kind of IP network, as well as an IP Multimedia Subsystem (IMS) domain. The PDN GW 126 and the serving GW 124 may be implemented in a single physical node or separate physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It is split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, such as the LTE unlicensed band, or may operate on different frequency bands with each cell operating in a different frequency band or only cells of different sizes operating on different frequency bands. As used herein, the term low power (LP) eNB refers to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may typically be the size of a residential gateway or smaller and generally connect to the user's broadband line. The femtocell may connect to the mobile operator's mobile network and provide extra coverage in a range of typically 30 to 50 meters. Thus, a LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe, in turn, may contain two slots of 0.5 ms. Each slot may contain 6-7 symbols, depending on the system used. A resource block (RB) (also called physical resource block (PRB)) may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. A downlink resource grid may be used for downlink transmissions from an eNB to a UE. The grid may be a time-frequency grid, which is the physical resource in the downlink in each slot. Each column and each row of the resource grid may correspond to one OFDM symbol and one OFDM subcarrier, respectively. The duration of the resource grid in the time domain may correspond to one slot. The smallest time-frequency unit in a resource grid is denoted as a resource element. Each resource grid may comprise a number of the above resource blocks, which describe the mapping of certain physical channels to resource elements. Each resource block may comprise 12 (subcarriers)*14 (symbols)=168 resource elements.

There may be several different physical downlink channels that are conveyed using such resource blocks. Two of these physical downlink channels may be the physical down link control channel (PDCCH) and the physical downlink shared channel (PDSCH). Each subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher-layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

In some embodiments, the UEs 102 may be able to enter a power saving mode (PSM. The PSM may target reducing power consumption for UEs by restricting the time when the UEs 102 are reachable for mobile terminating services. In particular, the PSM may allow the UE 102 to switch off any Access Stratum related functionality, i.e., terminate the transport of data between the radio network 101 and UE 102 over the network connection and management of radio resources. However, the PSM may be effective only after the network releases the UE 102 to idle mode, in which there is no Radio Resource Control (RRC) connection established between the UE 102 and the network 101. In some circumstances, it may take a more time than desired for the network 101 to release the UE 102 to idle mode and the UE 102 to enter the PSM.

In some embodiments, an eNB 104 may be configured to receive a PSM configuration indication of a UE 102 indicating that the UE 102 may be able to enter a PSM. In these embodiments, the eNB 104 may adjust timing of release of a RRC connection of the UE 102 based on the received PSM configuration indication. In some LTE embodiments, release of the RRC connection may occur when the UE 102 is in a connection mode. In some UMTS embodiments, release of the RRC connection may occur when the UE 102 is in a connection mode and in one of a cell paging channel (CELL PCH) state, a Universal Terrestrial Radio Access Network (UTRAN) Registration Area (URA) paging channel (URA PCH) state or a forward access channel (CELL FACH) state and at the adjusted transmission time.

Figure 2:
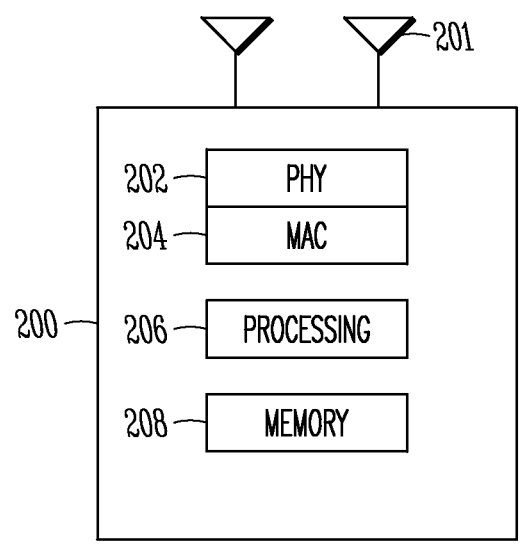
FIG. 2 illustrates a functional block diagram of a communication device in accordance with some embodiments in accordance with some embodiments.

FIG. 2 illustrates a functional block diagram of a communication device in accordance with some embodiments. The communication device 200 may be suitable for use as a UE, such as UE 102 (FIG. 1), or an eNB, such one or more of eNBs 104 (FIG. 1). The communication device 200 may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, a sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to 1/10 of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a Long-Term-Evolution (LTE) communication network or an LTE-Advanced communication network or a fifth generation (5G) LTE communication network or a high speed downlink/uplink access (HSDPA/HSUPA) communication network, although the scope of the invention is not limited in this respect.

As indicated above, due to the vastly increasing usage of MTC devices, it may be desirable to improve use of the power saving mode (PSM) for UEs. In one embodiment, the eNB or other radio network controller of the network may obtain information about a PSM configuration of a particular UE and make intelligent decisions related to that particular UE, for example, releasing the particular UE to idle mode based on the PSM configuration such as adjustment of the RRC inactivity timer operated by the eNB and other radio resource management based on the activation time indicated in a PSM configuration indication. The RRC inactivity timer may be the time determined by the RAN network from the last UE activity and switch the UE from RRC connected states to an RRC idle state. The RRC inactivity timer may be implementation or operator specific and may indicate the time that the eNB waits before releasing the UE if there is no data traffic detected for that UE during that time. In LTE, there may be two states such as RRC Connected mode and RRC idle mode. In UMTS (UTRAN), the RRC connected states may include a cell dedicated channel (Cell_DCH) state, a cell paging channel (CELL PCH) state, a Universal Terrestrial Radio Access Network (UTRAN) Registration Area (URA) paging channel (URA_PCH) state or a forward access channel (CELL_FACH) state.

In UMTS, a moving UE may be in one of several states in connected mode for a substantial amount of time (e.g., 30 minutes) before being moved to idle mode due to data inactivity. The UE may subsequently be moved from the idle mode into the PSM. In the CELL_PCH state, the UE is in connected mode, not transferring data and its location is known at the cell level. As the UE in CELL_PCH state changes the cell, an update is sent to the eNB to let the UTRAN know of the new position of the UE (i.e., that the UE has moved to a different cell). In the connected mode, the UE location is known at cell level rather than UTRAN level, as when the UE is in the idle state. While this works reasonably well with UEs that are stationary or move slowly with respect to the sizes of the serving cell and neighboring cells, the signaling overhead (the number of cell update messages) increases dramatically for rapidly moving UEs, defeating the purpose of the UE being in the CELL_PCH state. To combat this, multiple cells are combined to form a URA and the UE is able to be placed in a URA_PCH state. The URA_PCH state is similar to the CELL_PCH state, except that updates are sent to the eNB only when the UE changes its URA location and the paging area, when the UE is to be paged, is extended to all of the cells belonging to the URA. In one embodiment, overlapping URAs may be defined to be used in the URA_PCH state. Thus, each cell may be a separate URA in addition to other larger URAs. URAs with one or only a few cells may be assigned for slow moving UEs and larger URAs for faster moving UEs. In the CELL_FACH state, the UE location is known at a cell level, no dedicated physical channel is allocated to the UE, the UE continuously may monitor a FACH in the downlink, and the UE may be assigned a default common or shared transport channel in the uplink (e.g. RACH) to be used dependent on the access procedure for that transport channel.

A UE in connected mode for LTE and in any of the above states for UMTS, but which is not transmitting data, may waste energy and network resources due to undesired control signals being provided between the UE and the network. If the PSM configuration indication of the UE is shared with the UTRAN/EUTRAN, the NB/eNB (or other radio network controller) may be able to make a more intelligent decision as to whether to release the RRC connection of the UE, thereby leading to the ability to save network resources and make better use of the UE battery life by permitting the UE to enter the PSM sooner than this would otherwise occur. Thus, when the UE is in connected mode (for LTE) and a CELL_PCH state, a URA PCH state or a CELL_FACH state (for UMTS), timing of transmission of the RRC connection release may be adjusted by the eNB based on the active timer in the PSM configuration indication to set an adjusted transmission time for transmission of the RRC connection release.

When switching to the RRC idle state, the RRC connection between the UE and the RAN network may be released. The UE may then enter the PSM. In one embodiment, the PSM negotiation and configuration may be exchanged using non-access stratum (NAS) messages between the UE and the MME. The NAS is used to convey non-radio signaling between the UE and the MME through the eNB transparently, i.e., without interaction with the eNB. The NAS protocols may support UE mobility and session management procedures to establish and maintain IP connectivity between the UE and PDN GW as the UE moves.

In one embodiment, the PSM configuration indication sent from the UE may be a single bit information element (referred to as a "UE PSM Configured" information element, "PSM activation status" information element or "PSM Support" information element). The PSM configuration indication may indicate an activation timer for the UE to enter the PSM, which may consequently indicate that the UE has a PSM. The PSM configuration indication may also indicate a duration of the PSM. Thus, for example, if the PSM configuration indication indicates an activation timer of 0, this may indicate that the UE does not have a PSM. The UE PSM activation timer may be a 1-2 octet T3324 activation timer that the MME and UE have negotiated. A PSM activation request and related information may be provided from the UE to the MME in in response to different conditions being met. For example, the PSM activation request may be provided from the UE when the UE initially attaches to (registers with) the MME through the eNB, when the UE sends a tracking area update (TAU) to the MME by, for example, detecting that it has entered a tracking area that is not in the list of tracking areas that the UE previously registered in the MME, or when the UE sends a routing area update to the MME in crossing a routing area boundary from one routing area to another, as described in more detail below.

In various embodiments, the PSM configuration indication may be carried from the UE to the network using a number of different methodologies. The methods may include providing the PSM configuration indication to the eNB from the UE, from the MME or from another RAN node. In one embodiment, the PSM configuration indication may be provided to the eNB from the UE in a direct RRC message. In other embodiments, the PSM configuration indication may be provided to the eNB from the MME in a UE context transfer, in the core network assistance information or in UE assistance information, in new messages from the MME to the eNB, or in handover context transfer (handing over the UE from the serving eNB to a neighboring eNB).

In one embodiment, a special category of eNB may be used to aid UEs in the use of PSMs. The special category of eNB may be a dedicated MTC node (also referred to as a low cost eNB, a low cost MTC eNB or an MTC eNB among others) that may essentially have reduced functionality compared to normal eNBs. The dedicated MTC node may take into account that MTC UEs, unlike typical UEs such as smart phones, may not desire high (LTE) data rates or bandwidths. Thus, in one embodiment, the special category of eNB may offer lower data rates or bandwidths, have limited range or number of users, or cost less than a typical eNB. In one embodiment, the special category of eNB may be connected with the RAN and core networks in a manner similar to typical eNBs. In another embodiment, the special category of eNBs may be interconnected to corresponding dedicated core network entities (e.g., with special dedicated MME, S-GW, P-GW) that provide limited functionality, data rates, bandwidth, or features similar to the special category of eNB.

In some embodiments, the time the UE stays in the RRC connected mode by the eNB may be modified such that the UE is not in the RRC connected mode for extended periods of time before being released to idle mode. The eNB may start an inactivity timer for the UE. As above, the manner in which the inactivity time before releasing the UE is tracked may depend on the eNB implementation. When the timer expires or reaches the time indicated by the UE activation timer, a UE Context Release Request may be sent from the eNB to the MME through the S1 interface. The MME in response may send a Release Access Bearers Request to the S-GW through the S11 interface. The S-GW may release the S1-U bearers and respond to the MME with a Release Access Bearers Response. The MME may then respond to the eNB with a UE Context Release command. The eNB may transmit an RRC connection release message to the UE and, after receiving an acknowledgment from the UE, transmit a UE context release complete message to the MME.

While the inactivity timer in the eNB may be typically approximately 10 seconds, the inactivity timer for a particular UE may be adjusted dynamically based on the UE characteristics, including the PSM configuration indication and traffic inter-arrival time (i.e., the time difference between the arrival of two consecutive packets or consecutive burst of packets from/to the UE). Different UEs attached to the same serving eNB may have different PSM configuration indications and thus different inactivity timers.

Figure 3:
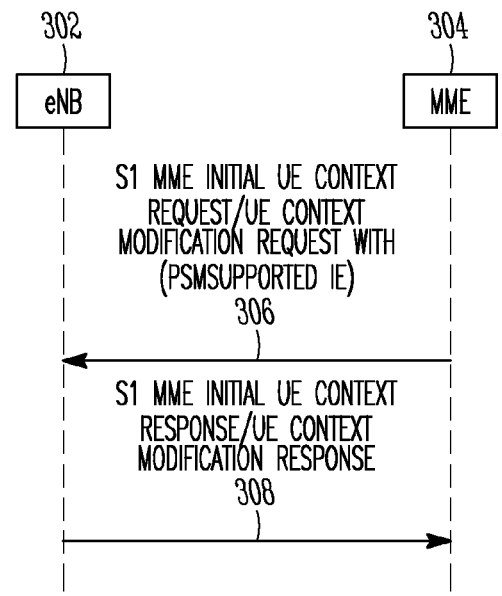
FIG. 3 illustrates a Power Saving Mode (PSM) configuration indication provided between an evolved node B (eNB) and a mobility management entity (MME) in accordance with some embodiments.

FIG. 3 illustrates a PSM configuration indication provided between an evolved node B (eNB) and a mobility management entity (MME) in accordance with some embodiments. In one embodiment, the PSM configuration indication may be added as part of the UE context that is shared by the MME 304 with the eNB 302. Whenever the UE transitions from idle to active mode, the UE may transmit a NAS service request to the MME (e.g., either by the UE having pending data or receiving a paging request from the eNB) 304. The MME 304 may provide the UE context information to the eNB 302 through the S1 interface using an Initial UE Context Setup Request 306.

The Initial UE Context Setup Request 306 may enable the eNB in turn to create a context and manage the UE for the duration of its activity in active mode. The MME 304 may assign a unique short temporary identity (the SAE Temporary Mobile Subscriber Identity (S-TMSI)) to the UE that identifies the UE context in the MME 304. The UE context may have user subscription information downloaded from the HSS and dynamic information, such as the list of established bearers and the UE capacities. The eNB 302 may store all UE context information and utilize different settings for radio resource allocation and connection management. The eNB 302, after storing the information contained in the Initial UE Context Setup Request 306 including the PSM configuration indication, may transmit to the MME 304 a message 308 indicating the successful update of the UE context information.

Similarly, in another embodiment, the PSM configuration indication may be provided when the UE context is updated. In particular, whenever the UE or MME 304 determines that the UE context is to be changed (e.g., by the transmitting a NAS attach request or NAS TAU request), the MME 304 may provide an update of the UE context information to the eNB 302 through the S1 interface using an UE Context Modify Request 306. The UE Context Modify Request, like the Initial UE Context Setup Request, may include a number of information elements that are stored by the eNB 302. The UE Context Modify Request may include, among others, a security key information element and UE Aggregate Maximum Bit Rate information element to which may be added a PSM configuration element containing the PSM configuration indication.

The eNB 302, after storing the PSM configuration indication contained in the UE Context Modify Request, may transmit to the MME 304 a message 308 indicating the successful update of the UE context information. Specifically, the eNB 302 may transmit to the MME 304 a UE Context Modify Response 308. By adding the PSM configuration indication as part of the UE context shared between the MME 304 and the eNB 302, modification of the existing UE context procedure may be avoided.

Figure 4:
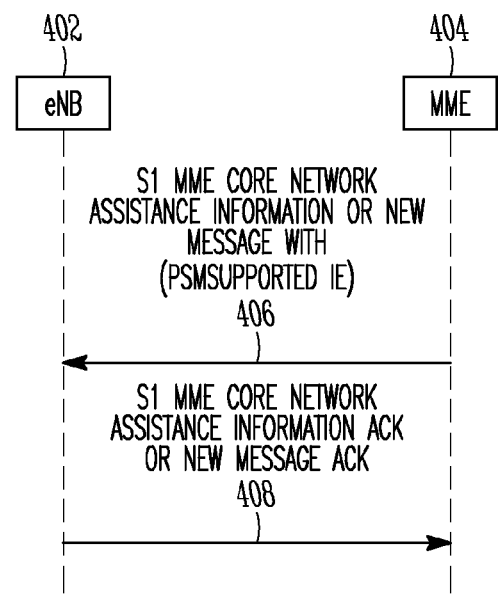
FIG. 4 illustrates a PSM configuration indication provided between an eNB and a MME in accordance with some embodiments.

FIG. 4 illustrates a PSM configuration indication provided between an eNB and a MME in accordance with some embodiments. In one such embodiment, rather than the PSM configuration being provided as an information element in an existing UE context message (as above, for example the Initial UE Context Setup Request or UE Context Modify Request shown in FIG. 3), the PSM configuration may be provided from the MME 404 to the eNB 402 in a new information element in a core network assistance information S1 message 406. The core network assistance information message may aid the eNB 402 or core network components in making efficient RRM related decisions the UE. In particular, the PSM configuration information provided between UE and MME 404 may be added as part of the UE capability that is provided from the MME 404 to the eNB 402 in the core network assistance information S1 message 406. The PSM configuration indication may be included in a traffic pattern parameter as part of the subscription information of the UE retained at the HSS. The traffic pattern parameter may be somewhat static and provide expected traffic of the UE, as determined by historical information for example, and may be used by the network for load balancing between eNBs or other statistical information. In some embodiments, a different parameter may be used that is sent in core network (CN) assistance information as indicated in 3GPP TS 23.401. The parameter containing the PSM configuration indication may be a new parameter that has not yet been defined in 3GPP Release 12.

The eNB 402, after storing the PSM configuration indication contained in the core network assistance information S1 message 406, may transmit to the MME 404 a message 408 indicating the successful receipt of the core network assistance information S1 message 406. Specifically, the eNB 402 may transmit to the MME 404 an acknowledgment (ACK) 408 of reception of the core network assistance information S1 message 406.

Alternatively, the PSM configuration indication may be provided from the MME 404 to the eNB 402 in an entirely new and separate dedicated message 406. In one embodiment, the eNB 402 may acknowledge the dedicated message containing the PSM configuration indication to the MME 404 in an ACK message 408. Alternatively, receipt of the dedicated message containing the PSM configuration indication may remain unacknowledged to the MME 404. By using a separate dedicated message, the timer information of the inactivity timer may be updated to reflect the activation timer whenever the UE changes the activation timer to transition the UE to the PSM. This permits backwards compatibility with previous 3GPP releases.

Figure 5:
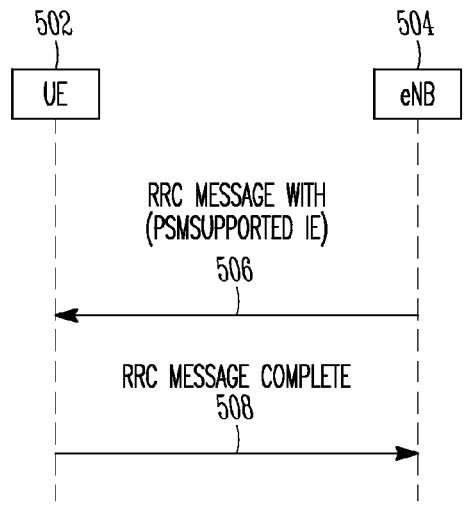
FIG. 5 illustrates a PSM configuration indication provided between a UE and a MME in accordance with some embodiments.

FIG. 5 illustrates a PSM configuration indication provided between a UE and a MME in accordance with some embodiments. In the embodiment shown in FIG. 5, the PSM configuration indication may be provided from the UE 502 to the eNB 504 in a currently used RRC message 506. In another embodiment, the PSM configuration indication may be provided from the UE 502 to the eNB 504 in an entirely new RRC message 506. RRC messages such as a "UE assistance information," "RRC connection setup complete" or "RRC Connection Reconfiguration Complete" messages, for example, may contain the information element providing the PSM configuration indication.

Similar to the embodiment of FIG. 4, the eNB 504 may acknowledge the RRC message containing the PSM configuration indication to the UE in an ACK message 508. Alternatively, receipt of the dedicated message containing the PSM configuration indication may remain unacknowledged to the UE 502. In addition to, or instead of, the acknowledgment being provided to the UE 502 from the eNB 504, the acknowledgment may also be provided from the eNB 504 to the MME (or RAN) (not shown in FIG. 5). The acknowledgment may be provided automatically from the eNB 504 to the MME in response to receiving the PSM configuration indication. Alternatively, the acknowledgment may be provided automatically from the eNB 504 to the MME based on a request from the MME. In this case, the eNB 504 may also either negotiate the activation timer on behalf of the RAN or allow the MME to renegotiate the activation timer with the UE.

In another embodiment, the eNB may explicitly request a PSM update from the UE before adjusting the inactivity timer. In particular, the eNB may request the PSM configuration indication from the UE or instruct the UE to transmit the PSM configuration indication to the MME. The eNB may transmit the request to the UE in response to the MME indicating to the eNB that the MME is able to support the PSM of the UE. In this case, if the eNB is unable or unwilling to support the PSM, extra signaling between the eNB, the UE and the MME may be avoided as the PSM configuration indication may be provided only to eNBs that are associated with a PSM. Similarly, in embodiments in which the PSM configuration is provided through a UE context transfer, a new information element provided in the core network assistance information message or in an entirely separate S1 message between the MME and eNB, the eNB may first request the PSM configuration from the MME rather than the MME automatically providing the PSM configuration to the eNB.

In further embodiments, dissemination of the PSM configuration indication may not be limited only to the eNB currently serving the UE. The PSM configuration indication may in addition be provided from the current serving (source) eNB to a neighboring (target) eNB. In one embodiment the PSM configuration indication may be forwarded from the source eNB to the target eNB during handover of the UE from the source eNB to the target eNB. In particular, the PSM configuration indication may be provided in the handover request message from the source eNB to the target eNB to initiate handover. In another embodiment, the PSM configuration indication may not automatically be provided in the handover request message. In this case, the target eNB may instead explicitly request the information from the source eNB before the source eNB provides the PSM configuration indication to the target eNB. As above, the target eNB may request the information from the MME and/or UE instead of from the source eNB. In other embodiments, the PSM configuration indication may be provided prior to the handover procedure being initiated, such as in situations in which the UE is traversing the serving cell relatively quickly towards the neighboring cell and initiation of the handover procedure is likely.

The eNB shown in FIGS. 3-5 may be suitable for use for one of eNBs 104 of FIG. 1. Similarly, the MME shown in FIGS. 3-5 may be suitable for use for MME 122 of FIG. 1.

Figure 6:
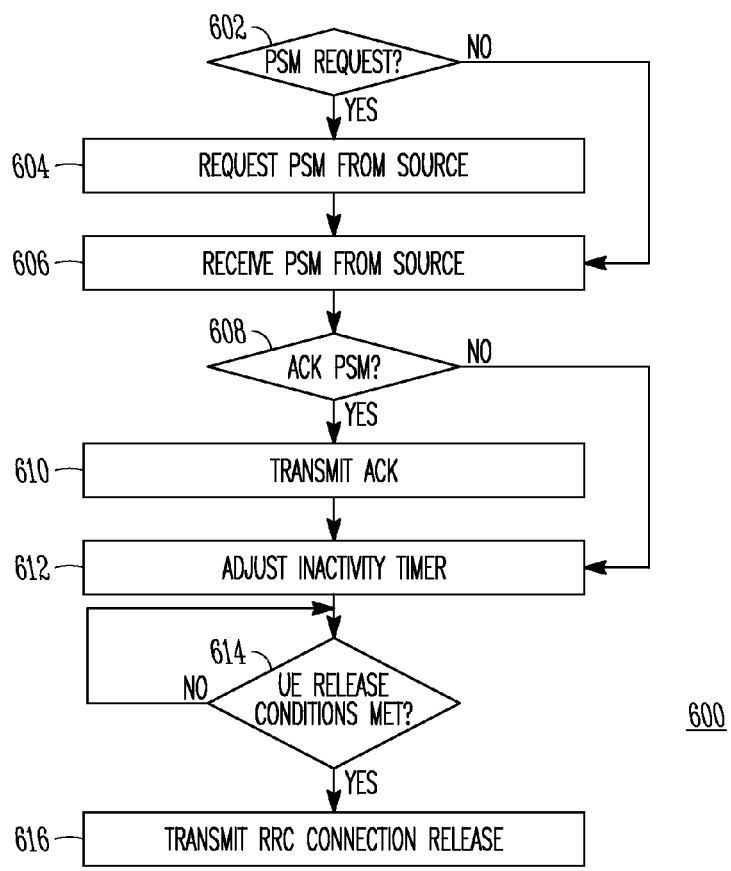
FIG. 6 illustrates a flowchart of a method of the eNB obtaining a PSM configuration indication of a UE in accordance with some embodiments.

FIG. 6 illustrates a flowchart of a method of the eNB obtaining a PSM configuration indication of a UE in accordance with some embodiments. The method 600 may include the eNB first determining at operation 602 whether a request for the PSM configuration indication is to be provided by the eNB to the source of the PSM configuration indication to the eNB. Although the UE may initially provide the PSM configuration indication to the RAN network, as indicated above the source of the PSM configuration indication to the eNB may be a different entity than the UE. In various embodiments, the source of the PSM configuration indication may be the MME, the UE, another eNB (in the case of handoff) or another RAN node. In some embodiments, the UE may provide the PSM configuration indication initially to the core network, such as to the MME, through a NAS message. Thus, eNB may not initially be aware of the PSM configuration of the UE even though the message containing the PSM configuration indication may have passed through the eNB. Determination by the eNB that a request for the PSM configuration indication is to be sent may result in one embodiment from the eNB receiving an RRC connection request from the UE without receiving the PSM configuration indication. In another embodiment, the eNB may determine that a request is to be sent from the eNB receiving attachment or connection modification information about the UE from the MME without receiving the PSM configuration indication from the MME.

If the eNB determines that a request for the PSM configuration indication is to be provided to the PSM configuration source, at operation 604 the eNB may transmit a request to the source to provide the PSM configuration to the eNB. In various embodiments, the eNB may automatically transmit the request to the MME, UE, another eNB or another entity from which the UE is being handed off. The eNB may retain in memory or prioritize the entity to which the request is to be made, e.g., first requesting the PSM configuration indication from the MME and, then requesting the PSM configuration indication from the UE if the MME indicates that it is unable to fulfill the request.

At operation 606 the eNB receives the PSM configuration indication from the source of the PSM configuration indication, either in response to the request by the eNB or automatically, if no request for the PSM configuration indication is to be provided by the eNB to the PSM configuration source. In one embodiment, the PSM configuration indication may be provided by the MME to the eNB in one or more information bits of an Initial UE Context Setup Request or a UE Context Modify Request. The Initial UE Context Setup Request may be transmitted from the MME to the eNB in response to the UE transmitting an attach request to the eNB, which is forwarded to the MME. Similarly, the UE Context Modify Request may be transmitted from the MME to the eNB in response to a change to the Packet Data Protocol context made by the RAN or core network or in response to the UE sending a Bearer Resource Allocation or Modification Request to the eNB. In another embodiment, the PSM configuration indication may be provided by the MME in a core network assistance information message. In another embodiment, the PSM configuration indication may be provided by the MME in a separate dedicated message, transmitted, e.g., immediately after the Initial UE Context Setup Request or UE Context Modify Request, or in response to the eNB requesting the PSM configuration indication. In a different embodiment, the PSM configuration may be provided not by the MME but by the UE in an RRC message.

The eNB determines at operation 608 whether to transmit an ACK to the PSM configuration source to indicate that the PSM configuration indication has been received. In some embodiments, the source of the PSM configuration indication may request an ACK or NACK response to any message sent to the eNB. In some embodiments, the source of the PSM configuration indication may request an ACK or NACK specifically for transmissions of certain messages, including the PSM configuration indication.

If the eNB determines that transmission of an acknowledgment to the PSM configuration source is warranted, at operation 610, the eNB may transmit the ACK (or NACK)

to the PSM configuration source to indicate that the PSM configuration has been received. A NACK may be transmitted from the eNB to the source of the PSM configuration indication if the PSM configuration indication is not received (or is partially received) by the eNB within a predetermined period, e.g., after the PSM configuration indication has been requested by the eNB or after the eNB would expect automatic transmission of the PSM configuration indication from the source of the PSM configuration indication.

Whether or not the eNB transmits an acknowledgment to the PSM configuration source to indicate that the PSM configuration indication has been received, at operation 612, the eNB may adjust an inactivity timer, such as that described above, based on the activation timer of the received PSM configuration indication. The inactivity timer may be used by the eNB to determine when to release the UE RRC connection after the last UE activity has occurred. In one embodiment, the UE may initially store an activation timer and provide the activation timer in the PSM configuration indication when attaching to the RAN network in the Initial UE Context Setup Request. In various embodiments, the MME may accept the activation timer or may negotiate a change of the activation timer with the UE. In some embodiments, the MME may determine that the activation timer should be increased, for example due to excessive traffic on the network in general or on the eNB to which the UE is or is to be attached. The MME in this embodiment may send a NAS message to the UE adjusting the activation timer. The MME may indicate the new activation timer in absolute terms (e.g., 20 min) or in terms relative to the existing activation timer (e.g., +10 min) In response, the UE may send a NAS message to the MME accepting the adjusted activation timer or may send another NAS containing further requests to adjust the activation timer. These negotiations may proceed between the UE and MME until an activation timer that is acceptable to both the UE and MME may be reached. Once the activation timer has been determined, the PSM configuration indication may be provided to the eNB.

In addition to the activation timer, which is used for the UE to enter the PSM, the UE and MME may negotiate the duration of the PSM. In one embodiment, the UE and may negotiate a duration of up to 54 min, which is the default amount of time as set by the TAU timer of the network, although other durations may also be suitable. Thus, in this embodiment, the UE may exit the PSM to provide data to allow the network to determine the location of the UE.

In some embodiments, in addition to negotiating the activation timer and duration during attachment, the UE and MME may negotiate the activation timer each time connection modification is to be performed for the UE. Thus, from time to time the activation timer and duration may be changed by either the UE or MME, e.g., based on changing traffic conditions in the network. Each UE connected with (or to be connected with) the eNBs associated with the MME may negotiate independently with the MME.

At operation 614, the eNB may determine whether conditions to release the UE are met. The eNB may take into consideration different factors to decide whether to release the RRC connection of the UE. These factors may include whether the PSM configuration of the PSM configuration indication has been met, the length of time the UE has been inactive and the network load among others. For UMTS systems, these conditions may include, for example, that the UE is in connected mode, in a CELL PCH, URA PCH or CELL FACH state and the release time determined by the inactivity timer of the eNB and the activation timer indicated by the PSM configuration indication has been reached. The eNB may have independent timers for each UE connected with the eNB.

Once the UE PSM conditions are met, the eNB may transmit a RRC connection release to the UE at operation 616. This may allow the UE to enter the idle state and the PSM mode. Later, when the PSM duration has been reached, the UE may exit the PSM to update the network with location and other information.

As described above, transfer of the PSM configuration to the eNB may be applied to LTE and UMTS procedures, in which the NB of the UMTS system is used in place of the eNB as described above.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 comprises an eNB comprising a transceiver configured to communicate with UE and processing circuitry. The processing circuitry is configured to: configure the transceiver to receive a power saving mode (PSM) configuration indication of the UE, the PSM configuration indication including a PSM configuration of the UE; adjust timing of release of a radio resource control (RRC) connection of the UE, when the UE is in a connection mode based on the received PSM configuration indication to set an adjusted transmission time; and configure the transceiver to transmit to the UE an RRC connection release message at an adjusted transmission time based on the received PSM configuration indication.

In Example 2, the subject matter of Example 1 can optionally include the processing circuitry being configured to: adjust an inactivity timer of the eNB based on the PSM configuration indication; and configure the transceiver to transmit to a mobility management entity (MME), the inactivity timer reaching a predetermined time indicated by the PSM configuration indication, a UE context release request to release a S1 context related to the UE between the eNB and the MME.

In Example 3, the subject matter of one or any combination of Examples 1-2 can optionally include the PSM configuration indication comprisinges a one-bit information element indicating that the PSM configuration indication is associated with the PSM of the UE and an activation timer associated with a T3324 timer negotiated between the UE and a mobility management entity (MME).

In Example 4, the subject matter of one or any combination of Examples 1-3 can optionally include the processing circuitry being configured to configure the transceiver to receive the PSM configuration indication from the UE.

In Example 5, the subject matter of one or any combination of Examples 1-4 can optionally include the processing circuitry being configured to configure the transceiver to receive the PSM configuration indication from a mobility management entity (MME).

In Example 6, the subject matter of Example 5 can optionally include the processing circuitry being configured to configure the transceiver to receive the PSM configuration indication in at least one of an Initial UE Context Setup Request and UE Context Modify Request from the MME.

Example 7 can include, or can optionally be combined with the subject matter of Example 6 to include that the Initial UE Context Setup Request or UE Context Modify Request is triggered in the MME by the MME receiving at least one of a Non-Access Stratum (NAS) service request, a NAS extended service request, a NAS attach request, and a NAS tracking area update (TAU) request.

In Example 8, the subject matter of Example 5 can optionally include the processing circuitry being configured to configure the transceiver to receive the PSM configuration indication in a predetermined parameter of core network assistance information from the MME.

In Example 9, the subject matter of Example 5 can optionally include the processing circuitry being configured to configure the transceiver to receive, from the MME, a separate message dedicated to providing the PSM configuration indication to the eNB.

In Example 10, the subject matter of Example 5 can optionally include the processing circuitry, prior to the transceiver receiving the PSM configuration indication of the UE from the MME, being configured to configure the transceiver to transmit to the MME a message configured to indicate to the MME to transmit to the eNB whether the UE has a PSM configuration indication.

In Example 11, the subject matter of one or any combination of Examples 1-5 can optionally include the processing circuitry being configured to configure the transceiver to transmit, during handover of the UE to another eNB, a PSM configuration indication associated with the PSM configuration indication to the other eNB.

In Example 12, the subject matter of Example 11 can optionally include the processing circuitry being configured to configure the transceiver to transmit the PSM configuration indication to the other eNB in response to receiving a request for the PSM configuration indication from the other eNB.

In Example 13, the subject matter of Example 11 can optionally include the processing circuitry being configured to adjust timing of release of the RRC connection of the UE when the UE is in a connection mode.

In Example 14, the subject matter of one or any combination of Examples 1-13 can optionally include an antenna configured to transmit communications between the transceiver and the UE.

Example 15 comprises a UE comprising: a transceiver configured to communicate with an evolved Node-B (eNB); and processing circuitry configured to: configure the transceiver to transmit a power saving mode (PSM) configuration indication comprising a PSM configuration indication; and configure the transceiver to receive from the eNB, when the UE is in connection mode, an RRC connection release message at a time that is based on the transmitted PSM configuration indication.

In Example 16, the subject matter of Example 15 can optionally include the PSM configuration indication comprising a one-bit information element indicating that the PSM configuration indication is associated with the PSM of the UE and an activation timer associated with a T3324 timer negotiated between the UE and a mobility management entity (MME).

In Example 17, the subject matter of one or any combination of Examples 15-16 can optionally include the processing circuitry being configured to configure the transceiver to transmit the PSM configuration indication to one of the eNB and a mobility management entity (MME).

Example 18 comprises a method of reducing power consumption in UE, the method comprising: receiving a power saving mode (PSM) configuration indication of the UE from one of the UE and a mobility management entity (MME), the PSM configuration indication including a PSM configuration indication; determining whether the UE is in a connection mode; and transmitting, from an evolved Node-B (eNB) to the UE, a radio resource control (RRC) connection release message in response to determining that the UE is in a connection mode, timing of transmission of the RRC connection release message based on the received PSM configuration indication.

In Example 19, the subject matter of Example 18 can optionally include receiving the PSM configuration indication comprises receiving the PSM configuration indication from the MME in one of: an Initial UE Context Setup Request, a UE Context Modify Request, a parameter of core network assistance information, and a message dedicated to providing the PSM configuration indication to the eNB.

In Example 20, the subject matter of one or any combination of Examples 18-19 can optionally include transmitting to the MME a message configured to indicate to the MME to transmit to the eNB whether the UE has a PSM configuration indication, the PSM configuration indication being received from the MME in response to the message.

In Example 21, the subject matter of one or any combination of Examples 18-20 can optionally include receiving the PSM configuration indication at the MME from the UE; and transmitting the PSM configuration indication from the MME to the eNB.

In Example 22, the subject matter of one or any combination of Examples 18-21 can optionally include transmitting from the eNB to the MME, upon expiration of an inactivity timer configured to be dependent on the PSM configuration indication, a UE context release request to release a S1 context related to the UE between the eNB and the MME; and releasing the S1 context in response to receiving the UE context release request.

In Example 23, the subject matter of one or any combination of Examples 18-22 can optionally include transmitting the PSM configuration indication to another eNB during handover of the UE to the other eNB.

In Example 24, the subject matter of Example 23 can optionally include transmitting the PSM configuration indication to the other eNB in response to receiving a request for the PSM configuration indication from the other eNB.

Example 25 comprises a non-transitory computer-readable storage medium that stores instructions for execution by one or more processors of an evolved Node-B (eNB) to configure the network entity to communicate via a transceiver with user equipment (UE), the one or more processors to configure the eNB to: receive a power saving mode (PSM) configuration indication of the UE from a mobility management entity (MME) in one of an Initial UE Context Setup Request, a UE Context Modify Request, a pattern parameter of core network assistance information, and a message dedicated to providing the PSM configuration indication to the eNB, the PSM configuration indication including a PSM configuration indication; determine whether the UE is in a connection mode; and transmit, from an evolved Node-B (eNB) to the UE, a radio resource control (RRC) connection release message in response to determining that the UE is in a connection mode, timing of transmission of the RRC connection release message based on the received PSM configuration indication.

In Example 26, the subject matter of Examples 25 can optionally include one or more processors to further configure the eNB to at least one of: transmit to the MME a message configured to indicate to the MME to transmit to the eNB whether the UE has a PSM configuration indication, the PSM configuration indication being received from the MME in response to the message; and transmit the PSM configuration indication to another eNB during handover of the UE to the other eNB.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first" "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An evolved Node-B (eNB) comprising:
a transceiver configured to communicate with user equipment (UE); and
processing circuitry to:
configure the transceiver to receive a power saving mode (PSM) configuration indication of the UE, the PSM configuration indication including a PSM configuration of the UE;
adjust timing of release of a radio resource control (RRC) connection of the UE, when the UE is in a connection mode based on the received PSM configuration indication to set an adjusted transmission time;
configure the transceiver to transmit to the UE an RRC connection release message at an adjusted transmission time based on the received PSM configuration indication; and
configure the transceiver to transmit, during handover of the UE to another eNB, a PSM configuration indication associated with the PSM configuration indication to the other eNB.

2. The eNB of claim 1, wherein the processing circuitry is further configured to:
adjust an inactivity timer of the eNB based on the PSM configuration indication; and
configure the transceiver to transmit to a mobility management entity (MME), the inactivity timer reaching a predetermined time indicated by the PSM configuration indication, a UE context release request to release a S1 context related to the UE between the eNB and the MME.

3. The eNB of claim 1, wherein:
the PSM configuration indication comprises a one-bit information element indicating that the PSM configuration indication is associated with the PSM of the UE and an activation timer associated with a T3324 timer negotiated between the UE and a mobility management entity (MME).

4. The eNB of claim 1, wherein the processing circuitry is configured to:
configure the transceiver to receive the PSM configuration indication from the UE.

5. The eNB of claim 1, wherein the processing circuitry is configured to:
configure the transceiver to receive the PSM configuration indication from a mobility management entity (MME).

6. The eNB of claim 5, wherein the processing circuitry is configured to:
configure the transceiver to receive the PSM configuration indication in at least one of an Initial UE Context Setup Request and UE Context Modify Request from the MME.

7. The eNB of claim 6, wherein the Initial UE Context Setup Request or UE Context Modify Request is triggered in the MME by the MME receiving at least one of a Non-Access Stratum (NAS) service request, a NAS extended service request, a NAS attach request, and a NAS tracking area update (TAU) request.

8. The eNB of claim 5, wherein the processing circuitry is configured to:
configure the transceiver to receive the PSM configuration indication in a predetermined parameter of core network assistance information from the MME.

9. The eNB of claim 5, wherein the processing circuitry is configured to:
configure the transceiver to receive, from the MME, a separate message dedicated to providing the PSM configuration indication to the eNB.

10. The eNB of claim 5, wherein, prior to the transceiver receiving the PSM configuration indication of the UE from the MME, the processing circuitry is further configured to:
configure the transceiver to transmit to the MME a message configured to indicate to the MME to transmit to the eNB whether the UE has a PSM configuration indication.

11. The eNB of claim 1, wherein the processing circuitry is further configured to:
configure the transceiver to transmit the PSM configuration indication to the other eNB in response to receiving a request for the PSM configuration indication from the other eNB.

12. The eNB of claim 1, wherein the processing circuitry is further configured to:
adjust timing of release of the RRC connection of the UE when the UE is in a connection mode.

13. The eNB of claim 1, further comprising:
an antenna configured to transmit communications between the transceiver and the UE.

14. An apparatus of a user equipment (UE) comprising:
a transceiver configured to communicate with an evolved Node-B (eNB); and
processing circuitry configured to:
configure the transceiver to transmit a power saving mode (PSM) configuration indication comprising a PSM configuration indication; and
configure the transceiver to receive from the eNB, when the UE is in connection mode, an RRC connection release message at a time that is based on the transmitted PSM configuration indication,
wherein during handover of the UE to another eNB, a PSM configuration indication associated with the PSM configuration indication is provided from the eNB to the other eNB.

15. The apparatus of claim 14, wherein:
the PSM configuration indication comprises a one-bit information element indicating that the PSM configuration indication is associated with the PSM of the UE and an activation timer associated with a T3324 timer negotiated between the UE and a mobility management entity (MME).

16. The apparatus of claim 14, wherein the processing circuitry is configured to:
configure the transceiver to transmit the PSM configuration indication to one of the eNB and a mobility management entity (MME).

17. A non-transitory computer-readable storage medium that stores instructions for execution by one or more processors of an evolved Node-B (eNB) to configure the network entity to communicate via a transceiver with user equipment (UE), the one or more processors to configure the eNB to:
receive a power saving mode (PSM) configuration indication of the UE from a mobility management entity (MME) in a message dedicated to providing the PSM configuration indication to the eNB, the message transmitted in response to the UE changing an activation timer to transition the UE to the PSM;
determine whether the UE is in a connection mode; and
transmit, from the eNB to the UE, a radio resource control (RRC) connection release message in response to determining that the UE is in a connection mode, timing of transmission of the RRC connection release message based on the received PSM configuration indication.

18. The non-transitory computer-readable storage medium of claim 17, wherein the one or more processors to further configure the eNB to at least one of:
transmit to the MME a message configured to indicate to the MME to transmit to the eNB whether the UE has a PSM configuration indication, the PSM configuration indication being received from the MME in response to the message; and
transmit the PSM configuration indication to another eNB during handover of the UE to the other eNB.

19. The non-transitory computer-readable storage medium of claim 17, wherein the one or more processors further configure the eNB:
request the PSM configuration from the MME rather than being automatically provided the PSM configuration from the MME.

20. The non-transitory computer-readable storage medium of claim 17, wherein:
the separate S1 message is separate from a core network assistance information message transmitted by the MME immediately after an Initial UE Context Setup Request or UE Context Modify Request.

* * * * *

UNITED STATES PATENT AND TRADEMARK OFFICE
CERTIFICATE OF CORRECTION

PATENT NO. : 9,877,236 B2  
APPLICATION NO. : 15/115770  
DATED : January 23, 2018  
INVENTOR(S) : Bangolae et al.

Page 1 of 1

It is certified that error appears in the above-identified patent and that said Letters Patent is hereby corrected as shown below:

In the Claims

In Column 20, Line 25, in Claim 18, after "processors", delete "to"

Signed and Sealed this  
Sixteenth Day of July, 2019

Andrei Iancu  
*Director of the United States Patent and Trademark Office*